(12) United States Patent
Thommes et al.

(10) Patent No.: US 7,836,126 B2
(45) Date of Patent: Nov. 16, 2010

(54) BUSINESS PRESENCE SYSTEM AND METHOD

(75) Inventors: Christoph A. Thommes, Schriesheim (DE); Corneliu D. Mitu, St. Leon-Rot (DE); Stefan Mueller, Sinsheim (DE)

(73) Assignee: SAP AG, Walldorf (DE)

( * ) Notice: Subject to any disclaimer, the term of this patent is extended or adjusted under 35 U.S.C. 154(b) by 1104 days.

(21) Appl. No.: 10/911,436

(22) Filed: Aug. 4, 2004

(65) Prior Publication Data

US 2006/0031293 A1 Feb. 9, 2006

(51) Int. Cl.
*G06F 15/16* (2006.01)
*G06F 15/173* (2006.01)
*H04M 3/00* (2006.01)

(52) U.S. Cl. .................. 709/204; 709/224; 379/265.05
(58) Field of Classification Search .................. 709/204
See application file for complete search history.

(56) References Cited

U.S. PATENT DOCUMENTS

| | | | | |
|---|---|---|---|---|
| 6,434,599 B1* | 8/2002 | Porter | ......................... | 709/204 |
| 6,691,162 B1* | 2/2004 | Wick | .......................... | 709/224 |
| 2002/0023134 A1* | 2/2002 | Roskowski et al. | ......... | 709/206 |
| 2002/0055975 A1* | 5/2002 | Petrovykh | .................... | 709/205 |
| 2002/0147777 A1* | 10/2002 | Hackbarth et al. | .......... | 709/205 |

OTHER PUBLICATIONS

Yanna Vogiazou & Milton Keynes; "Wireless Presence and Instant Messaging"; Nov. 2002; Knowledge Media Institute, The Open University.*
A.C.M Fong, S.C. Hui, and C.T. Lau; "Towards an open protocol for secure online presence notification"; 2001; Computer Standards & Interfaces 23 (2001); pp. 311-324.*
John C. Tang & James Begole; "Beyond Instant Messaging"; Nov. 2003; QUEUE; pp. 29-37.*

* cited by examiner

*Primary Examiner*—Ario Etienne
*Assistant Examiner*—Blake Rubin
(74) *Attorney, Agent, or Firm*—Mintz, Levin, Cohn, Ferris, Glovsky and Popeo P.C.

(57) ABSTRACT

Systems and methods for managing collaboration with one or more persons are disclosed. Presence information from the one or more persons are published to a server. One or more presence sources for each person are formed based on the present state of one or more communication channels. The presence information represents a present state of the one or more communication channels associated with each person. Selected ones of the one or more presence sources are integrated by an integrator to form a presence provider for at least one person. Presence provider data associated with the selected ones of the one or more presence sources is received at a user interface from the server.

18 Claims, 3 Drawing Sheets

BUSINESS PRESENCE SYSTEM AND METHOD

BACKGROUND

In a large, geographically distributed organization, collaboration in and between local or distributed teams and individuals is becoming increasingly important. Various types of communication and action are used in distributed teams to collaborate on projects. These include face-to-face meetings, e-mails, fax, phone calls or video conferences, short message service (SMS), instant messages, or virtual project rooms. However, without knowing a person's current business activities, a task of choosing the appropriate means of communication and/or action is difficult.

In current working environments of large organizations, knowledge of a person's "business activities" is spread throughout various different systems and information sources. Simplified examples of business activities are "attending a meeting", "working at one's desk", "working on one's laptop", "speaking on the phone", "working on customer project X", "being located in a room Y" or even "enjoying a vacation".

Example information sources about these activities can include a person's e-mail calendar, the person's online status in an enterprise portal, an online status in a public portal, the organization's vacation calendar in an Enterprise Resource Planning (ERP) system, a shift plan in a Workforce Management system (WMS), a list of assigned projects in a Project Management system (PMS), or a travel plan in a Travel Management system (TMS). Other sources could be RFID (Radio Frequency ID) tags which are embedded in a person's company id card that is always carried by the person. RFID scanners and related systems serve then as a location presence provider. Another source of information, useful in a globally-distributed team, is the current time in a person's time zone.

For each of the business activities, an extensible and dynamic set of characteristics can be defined for people to communicate and interact with each other. These sets of characteristics are known as "presence." A combination of such activities and information sources within the realm of the organization is called "business presence."

SUMMARY

A business presence system, method and application is disclosed, which provides a uniformed view on a person's availability with means to launch an appropriate collaborative communication activity based on a person's current business presence. Business presence information is provided by business presence sources, which can include any type of electronic communication device. The business presence information can be used by one or more applications to make an intelligent, balanced decision as to the best medium to employ for communication with a target person, and to launch or execute the selected medium.

In accordance with one embodiment, a system and computer program product are described for managing collaboration with one or more persons based on a present state of one or more communication channels associated with each person. The system or product includes a server for receiving and hosting the present state of the one or more communication channels to form one or more presence sources associated with each person. The system further includes an integrator for receiving and integrating selected ones of the one or more presence sources from the server to form a presence provider for each person, and an aggregator for aggregating the presence provider of at least one of the one or more persons to generate aggregate presence information.

In accordance with another embodiment, a method for managing collaboration with one or more persons includes publishing presence information from the one or more persons to a server, and forming one or more presence sources for each person based on a present state of the one or more communication channels. The presence information represents a present state of the one or more communication channels associated with each person. The method further includes receiving a selection for integrating selected ones of the one or more presence sources to form a presence provider for at least one person, and receiving presence provider data associated with the selected ones of the one or more presence sources from the server.

The details of one or more embodiments are set forth in the accompanying drawings and the description below. Other features, objects, and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

This document describes a framework and method to provide unified access to multiple business presence information sources. Techniques are also disclosed according to which the business presence information can be merged and displayed. In accordance with a general embodiment, a business presence system includes an application. The application is configured to provide a visual representation of a person's business presence in a uniform view, and thereby eases a user's decision on how to contact and act with the person. In one specific embodiment, the application is configured to show in a single view information representing the person's physical location and that person's availability by phone or any other type of electronic communication.

Figure 1:
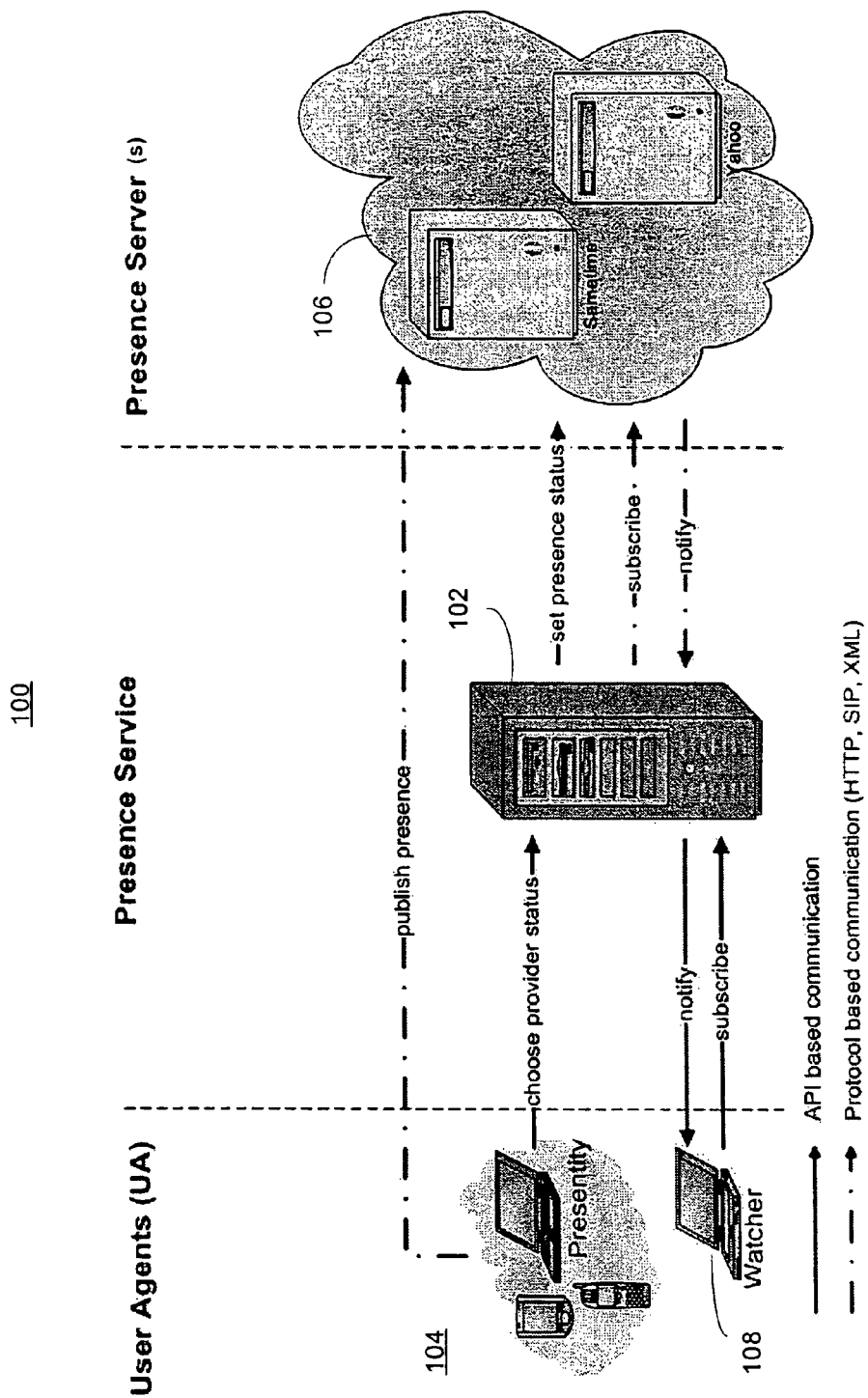
FIG. 1 is a system diagram of a business process system.

FIG. 1 is a block diagram of a business presence framework 100, including a presence service 102 for communication of business presence information that has been published from one or more presence entities (hereafter, "presentities") 104 to one or more presence servers 106. The presence service 102 includes a presence provider, explained in further detail below, that is selectively activated by each presentity 104. The presence provider communicates with the presence servers 106 in a publish and subscribe mode for receiving designated presence information for the presentity. At least one watcher 108 (i.e. authorized subscriber of specific presence information) communicates with the presence service 102, via the presence provider, in a publish and subscribe mode to receive selected presence information.

A presentity 104 represents a person and the collection of information sources and devices which provide components of the presence information. The information sources can include, without limitation, telephones, computers, personal digital assistants, portal pages, applications, etc. The accuracy and decision value of the presence information varies, although generally the more sources, the better the information. For example, in a typical Instant Messaging system, information that a person is logged on to the system is less valuable than that person's screen saver is on. In this case, information from the screen saver indicates unavailability of the person, such that an instant message may still not reach the person even though they may be logged on to the system.

Presence information can include a person's location. For instance, a presentity can include a radio frequency identifier (RFID) system to provide precise information as to location and/or movement within a geographical area. Such information is more useful in the context of a component of a collection of information sources. Accordingly, more information sources are desirable. However, each presence information source can be activated/selected by a presentity so as to not sacrifice privacy over effective information.

Figure 2:
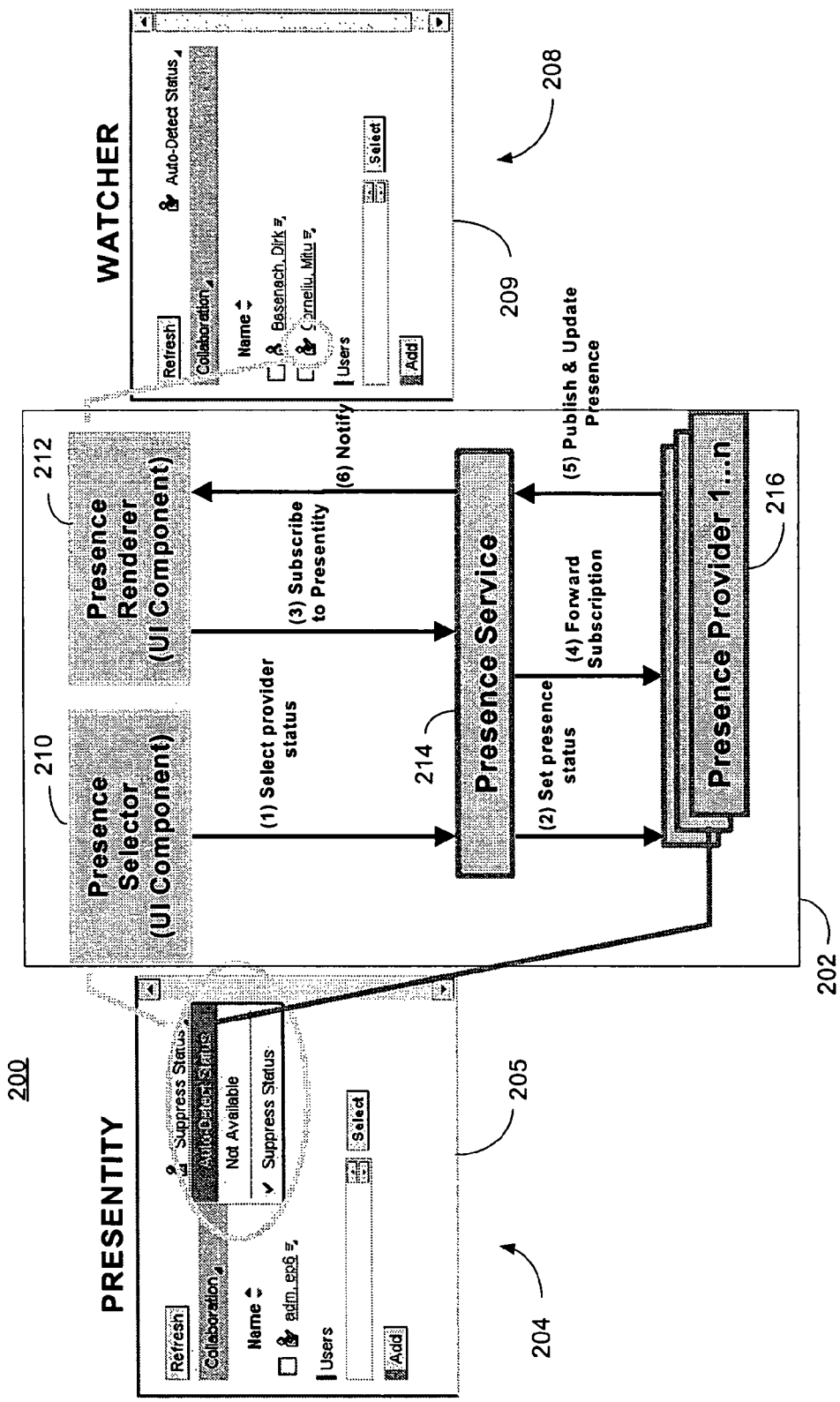
FIG. 2 is a block diagram of a use case for a business presence system.

FIG. 2 shows a use case 200 of a presence system 202 for communication of business presence information between a presentity 204 and a watcher 208. The presence system 202 includes a presence selector 210, which generates a user interface selector component 205 for the presentity 204, with which a person associated with the presentity 204 can select which information sources will be available to the presence service 202 and select a provider status. A presence service 214 receives the provider status, and sets the corresponding presence status in the one or more presence providers as indicated in the presence selector 210.

The presence system 202 also includes a presence renderer 212, which generates a user interface renderer component 209 for the watcher 208. The presence renderer 212 allows a user of the watcher 208 to subscribe to the presence service 214 for receiving information from a desired presentity 204. The presence service 214 forwards the subscription to the presence providers 216 selected by the presentity 204. The presence providers publish and update the requested presence information, per the subscription, to the presence service 214, which is then sent in notification to the presence renderer for display at the watcher 208.

The business presence system 200 thus offers a uniformed view, via the presence renderer 212, of a person. This view can be used to suggest or offer the most appropriate collaborative services with which to contact the person. A business presence application can suggests the services to the user in an automatically derived order based on the combination of the person's presence information, the person's individual choice and the availability of the respective service. For example, if the presence system shows a person as currently idle at his computer, but has a mobile telephone turned on, sending an SMS message to the mobile telephone will be selected and recommended over sending an email or instant message to the person's computer.

The most appropriate services that will be offered to a watcher 208 for communicating with a person is realized via a rules engine, i.e. any type of rules repository or database, and the person's profile settings via that person's presentity 204. The person can choose from multiple customizable business presence profiles for various communication media, such as: a) unavailable for all; b) unavailable for all but delegate (e.g. an assistant) or a defined set of other persons; or c) available for all. These customizable profiles are merely exemplary; other settings and profiles are possible.

The person can also select an order of preferred collaborative services which are used for establishing contact or for receiving information. Since a user is ultimately less interested in how the target person is contacted than that the person receives information as soon as possible, the selection of communication service can be delegated entirely to the business presence application. Depending on the business presence provider and status employed, additional services can be provided and handled by the rules engine. A Workforce Management system (WMS), for example, could offer an additional service of "reassign employee to new project" based on information managed by the business presence system 200.

Figure 3:
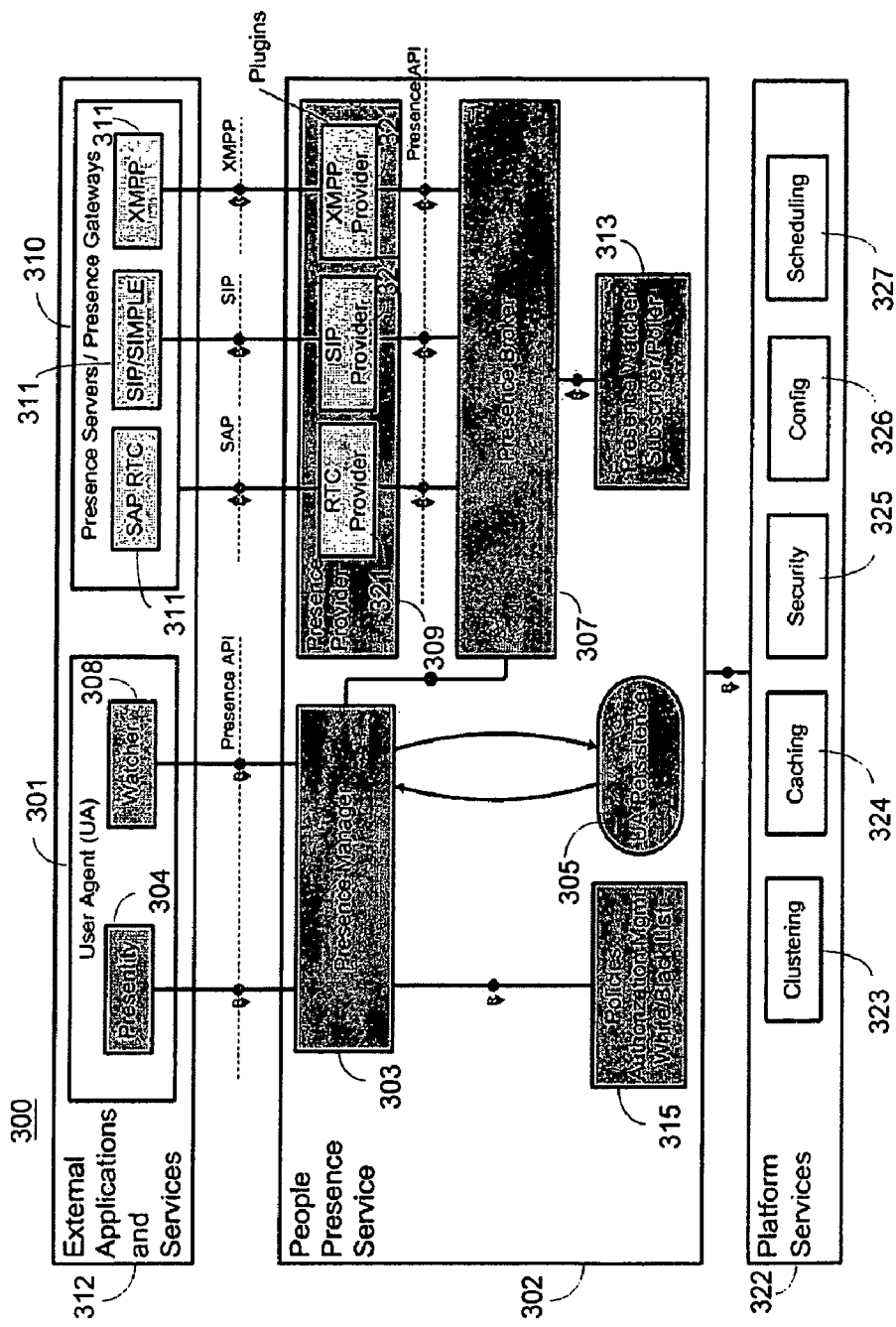
FIG. 3 is a block diagram of a business presence architecture.

FIG. 3 is a block diagram of a business presence architecture 300, preferably based on an open architecture framework. The architecture 300 employs a presence service 302 for communication of presence information between external applications and services 312. The presence service 302 employs one or more platform services 322 for various management and control functions. The presence service 302 includes a presence manager 303, a persistence storage 305, a presence broker 307 and a presence provider 309.

The presence information consists of an arbitrary number of elements, called presence tuples. Based on a presentity's 304 selection, the presence tuples are collected from the presence providers 309, unified, and delivered to interested watchers 308. A complete view of presence for a presentity 304 is likely to be derived from more than one source, where the complete view of presence information is composed of the presence from each source. The presence information can be obtained by a presence provider 309 in various ways, and not limited by any specific collection mechanism.

Each presence tuple includes: <id> unique id; <status> marker (information such as online/offline/away/do not disturb, etc.); an optional <communication> address (email, telephone number, IM id, etc.); optional <timestamp> element; and optional other presence markup.

The following standard statuses are defined by the presence:

UNAVAILABLE—if the presence provider 309 cannot provide presence due to communication errors or wrong configuration.

AWAITING AUTHORIZATION—if the authorization request has not yet been approved. This is available only for the authorization implemented at the presence service 302 level, presence providers 307 are responsible to provide their own states for handling presence server 310 based authorization.

SUPPRESS—if by security means (authorization, authentication) a presentity's 304 presence information is not available. This represents an "invisible" state in the given context, presence-based application, and external services 312 may decide how to interpret it.

In order to increase the user experience, the presence information delivered by presence providers can be enriched with additional attributes, such as icons, localized status, and tool tips, etc.

The presence provider 309 integrates different presence sources by implementing one or more plug-ins 321 for communicating with one or more presence servers gateways 311 of the presence server(s) 310. Exemplary plug-ins include SAP RTC, SIP/SIMPLE and XMPP providers, for communicating with associated gateways 311. The presence servers 310 are presence information providers. Each presence provider 309 defines a different status it supports, and whether a status represents a presentity's 304 selection, renders its presence information, or both. For example, "Auto-Detect" is a status only used to specify the presentity's 304 choice; "Away" is a status used only in the presentity's presence information; and "Do Not Disturb" is a status that can be used in both cases.

The presence provider 309 is configured to resolve a user agent 301 (presentity 304 or watcher 308) to a protocol-specific identifier, and transport the subscription and the notification to and from a presence server 310. The presence provider 309 enables each type of server gateways 311 to communicate with a presence server 310 in a protocol-independent manner. The presence information can be computed on demand, or stored explicitly. Each presence provider 309 can be configured to decide if the presence information is pre-computed and cached, or is computed at each request.

The presence provider 309 also provides information for building the presence selector list of a presentity 304. Along with the current presentity's 304 presence information, the presence provider 309 also delivers the selection the presentity 304 has made, whether or not this contains the same information as published presence information. A presence status can be selectable, and have only one presence provider 309 assigned. For example, the status selector 205 shown in FIG. 2 can include one presence provider 309 with two selectable presence statuses and the default "suppress" status. In case of more presence providers 309, possible presence selections can be grouped by presence provider 309.

Based on a presentity's 304 selection, the presence information is collected from the presence provider 309 and delivered to interested watchers 308. The presence tuples of a presentity 304 are rendered independently. Available services are grouped by presence provider 309 and accessed via separate context menus. Different presence tuples can be represented as different icons and tool-tips in a user interface. Services are available via the same context menu.

The presence manager 303 has two distinct sets of "clients": presentities 304, which select the state for the provider responsible for delivering its own presence information; and watchers 308, which receive presence information from the presence manager 303. The presence manager 303 maintains information about both presentity 304 and watcher 308 settings in the persistent storage 305, and is able to route the information via the presence broker 307 from the registered presence providers 309.

The presence manager 303 is configured to aggregate presence information from the presence provider 309, and implement the presence methods of SELECT, SUBSCRIBE, and NOTIFY. The presence manager 303 is also configured to implement policies and authorizations 315, such as a blacklist/whitelist for presence subscriptions, and authorization management of presence subscribers. The presence manager 303 also supports the generation and maintenance of "buddy lists."

The presence service 302 uses an event model that is based on the publish/subscribe model, similar to Java Message Service (JMS). The presence broker 307 manages this model by maintaining a list of subscribers 313 (i.e. watchers 308) to a presentity's 304 presence information, and forwarding each watcher's 308 subscription 313 to the appropriate presence provider(s) 309 based on the presentity's 304 selection. The presence broker 307 defines the minimal frequency a notification can occur. Notifications coming from a presence provider 309 with a higher frequency are ignored. The presence broker 307 also assembles the information received from presence providers 307 before delivering it to the watcher(s) 308.

The presence service 302 stores to the persistence 305 only the standard status "SUPPRESS" and retrieves the selections a presentity 304 has made from presence providers 309. If a presentity 304 has not yet made any selection for a presence provider 309, the presence provider 309 returns a default status or the standard status "UNAVAILABLE". Personalized status messages are only transported to the corresponding presence provider 309. The corresponding presence provider 309 decides if it supports personalized messages, if the messages are stored locally in the persistence 305 or redirected to the related presence server 310.

In operation, presence information is sent from a presence provider 309 to the presence broker 307, and distributed further to a designated watcher 308. If a presence provider 309 is not available the standard status "UNAVAILABLE" is assembled for the presentity's 304 presence information. A watcher 308 can request a subscription to a presentity's 304 presence information, independent of the presentity's 304 state. A watcher 308 can also fetch a presence information independent of the presentity's 304 state. If the presence service 302 has subscriptions for a presentity's 304 presence information, and that presence information changes, the presence service 302 delivers a notification to each watcher 308. When selected by a presentity 304, the standard status "SUPPRESS" is broadcasted to eligible presence providers 309 of a presentity's 304. The presence providers 309 may implement their own policy in handling this type of call.

The policies and authorizations block 315 manages authentication, authorizations, and policies that can be configured for the presence service 302. The authentication mechanism is preferably based on existing platform services. All subscription requests are considered to be authenticated. Any type of authentication method can be used, and the presence providers 309 can implement different specific authentication mechanisms for presence server 310 authentication if needed.

When a watcher 308 subscribes to the presence of a presentity 304, the subscription 313 needs to be authorized. The ability to accept subscriptions is under the direct control of the presentity 304, since presence information may be considered sensitive for privacy purposes. Similarly, presentities 304 have the ability to selectively reject subscriptions based on the subscriber identity (i.e. based on access control lists, etc.).

Presence Service handles the authorization as follows. A subscription, for which the watcher 308 is authorized to receive information about at least a subset of presence at least one point in time, is forwarded to the presence providers 307. If no standard status is selected, the presence information is the one delivered by the presence providers 307. The presence service 302 will deliver the status "SUPPRESS" if the watcher 308, due to security constraints, is not allowed to access any presence information for a presentity 304.

The presence service 302 will deliver a standard status "AWAITING AUTHORIZATION" for a subscription for which it is not yet known to be successful or rejected. Generally, a pending subscription occurs when the presence server 310 cannot obtain authorization at the time of the subscription, but may be able to do so at a later time, perhaps when the presentity 302 becomes available. The means by which a presentity 302 can change specific presence provider 309 authorization policies can be established at the time the presence provider 309 is implemented.

The business presence architecture 200 further includes platform services 322 in communication with the presence service 302. The platform services 322 provides maintenance and data management services to the presence information collected and disseminated by the presence service 302. The platform services 322 includes clustering 323, caching 324, security 325, configuration management 326, and scheduling 327 for the presence information. Still other services may be provided by the platform services 322.

Although a few embodiments have been described in detail above, other modifications are possible. The logic or process flows described in reference to FIGS. 1-3 need not necessarily be executed in the order described and still be within the scope of this description. Other embodiments may be within the scope of the following claims.

The invention claimed is:

1. A system for managing collaboration with one or more persons, the system comprising:
   a server that receives from a plurality of information sources a present state of each of a plurality of different communication channels that are associated with a person of the one or more persons, the plurality of information sources comprising an electronic mail calendar, an enterprise resource planning (ERP) system, a workforce management system (WMS), a project management system (PMS), and a travel management system (TMS), the plurality of different communication channels comprising electronic mail, video conferencing, short message service, instant messaging, and a virtual project room, the server hosting the present state of each of the plurality of different communication channels and forming a presence source for each different communication channel;
   an integrator that receives and integrates a selected one or more of the presence sources from the server to form a presence provider for the person; and
   an aggregator that generates aggregate presence information for each person from two or more of the presence sources, the aggregate presence information comprising a status of two or more of the plurality of different communication channels via which the person can be contacted; and
   a selection engine that selects, based on data associated with the presence provider, at least one of the plurality of communication channels for communicating to the person, the presence provider resolving a user agent to a protocol-specific identifier for the at least one communication channel, the user agent providing a presence subscription service.

2. A system in accordance with claim 1, further comprising a broker that maintains a list of subscribers to the aggregate presence information.

3. A system in accordance with claim 2, wherein the broker forwards one or more subscription requests associated with the list of subscribers to the aggregator.

4. A system in accordance with claim 3, wherein the aggregator aggregates the presence information based on the one or more subscription requests.

5. A system in accordance with claim 3, further comprising a manager configured to route the aggregate presence information to a subscriber based on an associated subscription request.

6. A system in accordance with claim 1, wherein the integrator further comprises a plug-in adapted for protocol-independent receipt of data representing the present state of each one of the one or more different communication channels.

7. A system in accordance with claim 5, further comprising a persistence storage that stores settings and policies associated with the subscription requests.

8. A method for managing collaboration with one or more persons, the method comprising:
   publishing, via a plurality of information sources, presence information from the one or more persons to a server, the presence information representing a present state of a plurality of different communication channels associated with each person, the plurality of information sources comprising an electronic mail calendar, an enterprise resource planning (ERP) system, a workforce management system (WMS), a project management system (PMS), and a travel management system (TMS), the plurality of different communication channels comprising electronic mail, video conferencing, short message service, instant messaging, and a virtual project room;
   forming a presence source for each of the plurality of different communication channels for the person based on the present state of the plurality of different communication channels for the person;
   receiving and integrating a selected one or more of the presence sources to form a presence provider for the person;
   receiving presence provider data for the person from the server, the presence provider data comprising aggregate presence information from two or more of the presence sources, the aggregate presence information comprising a status of two or more of the plurality of different communication channels via which the person can be contacted; and
   selecting, based on data associated with a presence provider, at least one of the one or more communication channels for communicating to the person.

9. A method in accordance with claim 8, further comprising aggregating one or more presence providers to generate the presence provider.

10. A method in accordance with claim 9, further comprising receiving subscription requests from one or more subscribers for the aggregate presence information.

11. A method in accordance with claim 10, further comprising delivering data representing the presence provider for the person based on a subscription request.

12. A method in accordance with claim 8, further comprising:
   providing a user interface component to the person; and
   publishing the aggregate presence information from the user interface component.

13. A method in accordance with claim 11, further comprising:
   providing a user interface component to at least one subscriber; and
   delivering data representing the aggregate presence provider to the user interface component.

14. A computer product for managing collaboration with one or more persons, the system comprising:
   at least one user terminal that sends presence information based on a present state of a plurality of different communication channels associated with a user, the presence information being collected from a plurality of information sources, the plurality of information sources comprising an electronic mail calendar, an enterprise resource planning (ERP) system, a workforce management system (WMS), a project management system (PMS), and a travel management system (TMS), the plurality of different communication channels comprising electronic mail, video conferencing, short message service, instant messaging, and virtual project rooms;
   a server that receives and hosts the present states of the plurality of different communication channels to form a presence source for each communication channel associated with the user; and
   a presence service computer including computer program code that, causes a processor upon which it is executed to:
   receive and integrate a selected one or more of the presence sources from the server to form a presence provider for the person;
   aggregate the presence provider of the person to generate aggregate presence information, the aggregate presence information comprising a status of two or more of the plurality of different communication channels via which the person can be contacted; and select, based on data associated with the presence provider, at least one of the plurality of communication channels for communicating to the person, the presence provider resolving a user agent to a protocol-specific identifier for the at least one communication channel, the user agent providing a presence subscription service.

15. A computer product in accordance with claim 14, further comprising:

at least one subscriber terminal configured to send subscription requests to the presence service computer; and computer program code associated with the presence service computer that delivers at least a portion of the aggregate presence information to the at least one subscriber terminal based on a subscription request.

16. A computer product in accordance with claim 14, wherein the presence service computer further includes computer program code that maintains a list of subscribers for the aggregate presence information.

17. A computer product in accordance with claim 16 wherein the presence service computer further includes computer program code that forwards one or more subscription requests associated with the list of subscribers to the aggregation service.

18. A computer product in accordance with claim 17 wherein the presence service computer further includes computer program code that routes the aggregate presence information to a subscriber based on an associated subscription request.

* * * * *